US007613996B2

(12) United States Patent
Dallett et al.

(10) Patent No.: US 7,613,996 B2
(45) Date of Patent: Nov. 3, 2009

(54) ENABLING SELECTION OF AN INFERRED SCHEMA PART

(75) Inventors: Nicholas K Dallett, Kirkland, WA (US); Scott M. Roberts, Bothell, WA (US); Brian C. Teutsch, Seattle, WA (US); Jun Jin, Bellevue, WA (US); Willson Kulandai-Raj David, Woodinville, WA (US); Joshua S. Bell, Kirkland, WA (US); David M Snow, Seattle, WA (US); Aleksandr Tysbert, Redmond, WA (US); Shuk-Yan Lai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 11/203,937

(22) Filed: Aug. 15, 2005

(65) Prior Publication Data
US 2007/0038927 A1   Feb. 15, 2007

(51) Int. Cl.
*G06F 17/00* (2006.01)
(52) U.S. Cl. ............... 715/223; 715/221; 715/222; 715/237
(58) Field of Classification Search ......... 715/221–223, 715/235, 237
See application file for complete search history.

(56) References Cited

U.S. PATENT DOCUMENTS

| 4,201,978 A | 5/1980 | Nally |
| 4,498,147 A | 2/1985 | Agnew et al. |
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |

(Continued)

FOREIGN PATENT DOCUMENTS

EP    0841615    11/1999

(Continued)

OTHER PUBLICATIONS

Microsoft Corporation, "Microsoft Computer Dictionary" Microsoft Press, Fifth Edition, p. 149.

(Continued)

*Primary Examiner*—Stephen S Hong
*Assistant Examiner*—Adam M Queler

(57) ABSTRACT

Systems and/or methods ("tools") are described that convert or present conversion problems for electronic documents. The tools may convert a generally unstructured electronic document to a generally structured electronic document using non-visual textual and layout information of the unstructured document. The tools can also present possible problems with this or other types of conversion. And the tools can enable a user to alter an electronic document's schema without altering its visual layout.

10 Claims, 10 Drawing Sheets

U.S. PATENT DOCUMENTS

| | | |
|---|---|---|
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A * | 9/1997 | Malamud et al. ............ 715/816 |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |

| | | | | | | |
|---|---|---|---|---|---|---|
| 6,044,205 | A | 3/2000 | Reed et al. | 6,344,862 B1 | 2/2002 | Williams et al. |
| 6,052,531 | A | 4/2000 | Waldin et al. | 6,345,256 B1 | 2/2002 | Milsted et al. |
| 6,052,710 | A | 4/2000 | Saliba et al. | 6,345,278 B1 | 2/2002 | Hitchcock et al. |
| 6,054,987 | A | 4/2000 | Richardson | 6,345,361 B1 | 2/2002 | Jerger et al. |
| 6,065,043 | A | 5/2000 | Domenikos et al. | 6,347,323 B1 | 2/2002 | Garber et al. |
| 6,069,626 | A | 5/2000 | Cline et al. | 6,349,408 B1 | 2/2002 | Smith |
| 6,070,184 | A | 5/2000 | Blount et al. | 6,351,574 B1 | 2/2002 | Yair et al. |
| 6,072,870 | A | 6/2000 | Nguyen et al. | 6,353,851 B1 | 3/2002 | Anupam et al. |
| 6,078,326 | A | 6/2000 | Kilmer et al. | 6,353,926 B1 | 3/2002 | Parthesarathy et al. |
| 6,078,327 | A | 6/2000 | Liman et al. | 6,356,906 B1 | 3/2002 | Lippert et al. |
| 6,078,924 | A | 6/2000 | Ainsbury et al. | 6,357,038 B1 | 3/2002 | Scouten |
| 6,081,610 | A | 6/2000 | Dwork et al. | 6,366,907 B1 | 4/2002 | Fanning et al. |
| 6,084,585 | A | 7/2000 | Kraft et al. | 6,366,912 B1 | 4/2002 | Wallent et al. |
| 6,088,708 | A | 7/2000 | Burch et al. | 6,367,013 B1 | 4/2002 | Bisbee et al. |
| 6,091,417 | A | 7/2000 | Lefkowitz | 6,369,840 B1 | 4/2002 | Barnett et al. |
| 6,094,657 | A | 7/2000 | Hailpern et al. | 6,369,841 B1 | 4/2002 | Salomon et al. |
| 6,096,096 | A | 8/2000 | Murphy et al. | 6,374,402 B1 | 4/2002 | Schmeidler et al. |
| 6,097,382 | A * | 8/2000 | Rosen et al. ............... 715/762 | 6,381,742 B2 | 4/2002 | Forbes et al. |
| 6,098,081 | A | 8/2000 | Heidorn et al. | 6,381,743 B1 | 4/2002 | Mutschler, III |
| 6,105,012 | A | 8/2000 | Chang et al. | 6,389,434 B1 | 5/2002 | Rivette |
| 6,108,637 | A | 8/2000 | Blumenau | 6,393,456 B1 | 5/2002 | Ambler et al. |
| 6,108,783 | A | 8/2000 | Krawczyk et al. | 6,396,488 B1 | 5/2002 | Simmons et al. |
| 6,115,646 | A | 9/2000 | Fiszman et al. | 6,397,264 B1 | 5/2002 | Stasnick et al. |
| 6,121,965 | A | 9/2000 | Kenney et al. | 6,405,221 B1 | 6/2002 | Levine et al. |
| 6,122,647 | A | 9/2000 | Horowitz | 6,405,238 B1 | 6/2002 | Votipka |
| 6,144,969 | A | 11/2000 | Inokuchi et al. | 6,408,311 B1 | 6/2002 | Baisley et al. |
| 6,151,624 | A | 11/2000 | Teare et al. | 6,414,700 B1 | 7/2002 | Kurtenbach et al. |
| 6,154,128 | A | 11/2000 | Wookey et al. | 6,421,070 B1 | 7/2002 | Ramos et al. |
| 6,163,772 | A | 12/2000 | Kramer et al. | 6,421,656 B1 | 7/2002 | Cheng et al. |
| 6,167,521 | A | 12/2000 | Smith et al. | 6,421,777 B1 | 7/2002 | Pierre-Louis et al. |
| 6,167,523 | A | 12/2000 | Strong | 6,425,125 B1 | 7/2002 | Fries et al. |
| 6,182,094 | B1 | 1/2001 | Humpleman et al. | 6,429,885 B1 | 8/2002 | Saib et al. |
| 6,182,095 | B1 | 1/2001 | Leymaster et al. | 6,434,563 B1 | 8/2002 | Pasquali et al. |
| 6,188,401 | B1 | 2/2001 | Peyer | 6,434,564 B2 | 8/2002 | Ebert |
| 6,191,797 | B1 | 2/2001 | Politis | 6,442,563 B1 | 8/2002 | Bacon et al. |
| 6,192,367 | B1 | 2/2001 | Hawley et al. | 6,442,755 B1 | 8/2002 | Lemmons et al. |
| 6,195,661 | B1 | 2/2001 | Filepp et al. | 6,446,110 B1 | 9/2002 | Lection et al. |
| 6,199,204 | B1 | 3/2001 | Donohue | 6,449,617 B1 | 9/2002 | Quinn et al. |
| 6,209,128 | B1 | 3/2001 | Gerard et al. | 6,457,009 B1 | 9/2002 | Bollay |
| 6,216,152 | B1 | 4/2001 | Wong et al. | 6,460,058 B2 | 10/2002 | Koppolu et al. |
| 6,219,698 | B1 | 4/2001 | Iannucci et al. | 6,463,419 B1 | 10/2002 | Kluss |
| 6,225,996 | B1 | 5/2001 | Gibb et al. | 6,470,349 B1 | 10/2002 | Heninger |
| 6,235,027 | B1 | 5/2001 | Herzon | 6,473,800 B1 | 10/2002 | Jerger et al. |
| 6,243,088 | B1 | 6/2001 | McCormack et al. | 6,476,828 B1 | 11/2002 | Burkett et al. |
| 6,253,366 | B1 | 6/2001 | Mutschler, III | 6,476,833 B1 | 11/2002 | Moshfeghi |
| 6,253,374 | B1 | 6/2001 | Dresevic et al. | 6,477,544 B1 | 11/2002 | Bolosky |
| 6,263,313 | B1 | 7/2001 | Milsted et al. | 6,480,860 B1 | 11/2002 | Monday |
| 6,266,810 | B1 | 7/2001 | Tanaka et al. | 6,487,566 B1 | 11/2002 | Sundaresan |
| 6,268,852 | B1 | 7/2001 | Lindhorst et al. | 6,490,601 B1 | 12/2002 | Markus et al. |
| 6,275,227 | B1 | 8/2001 | DeStefano | 6,493,702 B1 | 12/2002 | Adar et al. |
| 6,275,599 | B1 | 8/2001 | Adler et al. | 6,501,864 B1 | 12/2002 | Eguchi et al. |
| 6,279,042 | B1 | 8/2001 | Ouchi | 6,502,101 B1 | 12/2002 | Verprauskus et al. |
| 6,281,896 | B1 | 8/2001 | Alimpich et al. | 6,502,103 B1 | 12/2002 | Frey et al. |
| 6,282,709 | B1 | 8/2001 | Reha et al. | 6,505,200 B1 | 1/2003 | Ims et al. |
| 6,282,711 | B1 | 8/2001 | Halpern et al. | 6,505,230 B1 | 1/2003 | Mohan et al. |
| 6,286,033 | B1 | 9/2001 | Kishinsky et al. | 6,505,300 B2 | 1/2003 | Chen et al. |
| 6,292,897 | B1 | 9/2001 | Gennaro et al. | 6,507,856 B1 | 1/2003 | Chen et al. |
| 6,292,941 | B1 | 9/2001 | Jollands | 6,516,322 B1 | 2/2003 | Meredith |
| 6,297,819 | B1 | 10/2001 | Furst | 6,519,617 B1 | 2/2003 | Wanderski et al. |
| 6,300,948 | B1 | 10/2001 | Geller et al. | RE38,070 E | 4/2003 | Spies et al. |
| 6,307,955 | B1 | 10/2001 | Zank et al. | 6,546,546 B1 | 4/2003 | Van Doorn |
| 6,308,179 | B1 | 10/2001 | Petersen et al. | 6,546,554 B1 | 4/2003 | Schmidt et al. |
| 6,308,273 | B1 | 10/2001 | Goertzel et al. | 6,549,221 B1 | 4/2003 | Brown et al. |
| 6,311,271 | B1 | 10/2001 | Gennaro et al. | 6,549,878 B1 | 4/2003 | Lowry et al. |
| 6,314,415 | B1 | 11/2001 | Mukherjee | 6,549,922 B1 | 4/2003 | Srivastava et al. |
| 6,321,259 | B1 | 11/2001 | Ouellette et al. | 6,553,402 B1 | 4/2003 | Makarios et al. |
| 6,321,334 | B1 | 11/2001 | Jerger et al. | 6,560,616 B1 | 5/2003 | Garber |
| 6,327,628 | B1 | 12/2001 | Anuff et al. | 6,560,620 B1 | 5/2003 | Ching |
| 6,331,864 | B1 | 12/2001 | Coco et al. | 6,560,640 B2 | 5/2003 | Smethers |
| 6,342,907 | B1 | 1/2002 | Petty et al. | 6,563,514 B1 | 5/2003 | Samar |
| 6,343,149 | B1 | 1/2002 | Motoiwa | 6,571,253 B1 | 5/2003 | Thompson et al. |
| 6,343,302 | B1 | 1/2002 | Graham | 6,578,144 B1 | 6/2003 | Gennaro et al. |
| 6,343,377 | B1 | 1/2002 | Gessner et al. | 6,581,061 B2 | 6/2003 | Graham |

| Patent | Date | Inventor |
|---|---|---|
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin |
| 6,751,777 B2 | 6/2004 | Bates |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,120,863 B1 | 10/2006 | Wang |
| 7,124,167 B1* | 10/2006 | Bellotti et al. ............... 709/206 |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,236,982 B2 | 6/2007 | Zlatanov et al. |
| 7,249,328 B1 | 7/2007 | Davis |
| 7,281,018 B1 | 10/2007 | Begun et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Stanciu et al. |

| | | |
|---|---|---|
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,373,595 B2 | 5/2008 | Jones et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,441,200 B2 | 10/2008 | Savage |
| 7,496,837 B1 | 2/2009 | Larcheveque et al. |
| 7,543,228 B2 | 6/2009 | Kelkar |
| 7,549,115 B2 | 6/2009 | Kotler |
| 7,584,417 B2 | 9/2009 | Friend |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan |
| 2001/0051928 A1 | 12/2001 | Brody |
| 2001/0054004 A1 | 12/2001 | Powers |
| 2001/0056429 A1 | 12/2001 | Moore |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1 | 2/2003 | Bodlaender et al. |
| 2003/0038846 A1* | 2/2003 | Hori et al. .................. 345/809 |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown et al. |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora et al. |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039881 A1 | 2/2004 | Shoebridge et al. |

| | | |
|---|---|---|
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181711 A1 | 9/2004 | Johnson et al. |
| 2004/0186762 A1 | 9/2004 | Beaven et al. |
| 2004/0189708 A1* | 9/2004 | Larcheveque et al. ....... 345/780 |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0246304 A1 | 11/2005 | Knight et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1* | 6/2006 | Catorcini et al. ............ 707/101 |
| 2006/0129978 A1 | 6/2006 | Abriani et al. |
| 2006/0143220 A1 | 6/2006 | Spencer |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0200754 A1 | 9/2006 | Kablesh et al. |
| 2007/0005611 A1 | 1/2007 | Takasugi et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2007/0276768 A1 | 11/2007 | Pallante |
| 2008/0028340 A1 | 1/2008 | Davis |
| 2008/0126402 A1 | 5/2008 | Sitchi et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |

| | | |
|---|---|---|
| JP | 6180698 | 6/1994 |
| JP | 10-2207805 | 8/1998 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO-0157720 | 8/2001 |

OTHER PUBLICATIONS

Pacheco, Xavier et al., "Delphi 5 Developer's Guide", Sams Publishing. Chapter 31, Section: Data Streaming,(1999),4.

Atova, "User Reference manual Version 4.4, XML Spy suite 4.4," Atova Ges.m.b.H and Altova, Inc., May 24, 2002, pages cover, copyright page 1-565.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Bruce Hallberge et al "Using Microsoft Excel 97" (Public release 1997, by Que Corp) pp. 145-145 and 196-199.

Cybook, Inc.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 05, 2000, entitled, "Methods and systems for accessing, organizing presenting and viewing data".

Macromedia, Inc.: "Dreamweaver Technote, Changes in copying and pasting in Dreamweaver 4" Internet Article (online). *the whole document*.

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Rado, Dave: "How to create a template that makes it easy for users to "fill in the blanks", without doing any programming" Microsoft Word MVP FAQ Site, (online) Apr. 30, 2004. the whole document.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999), 1-5.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007, (Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon , "InfoPath and XForms", Retrieved from the Internet at http://weblog.infoworld.com/udell/2003/02/26.html,(Feb. 26, 2003).

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Hu, et al., "A Programmable Editor for Developing Structured Documents based on Bidirectional Transformations", ACM,(Aug. 2004),178-179.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Bradley, Neil "The XML Companion, Third Edition", *Published by Addison Wesley Professional*, http://proquest.safaribooksonline.com0201770598, http,(Dec. 12, 2001),1-18.

Klarlund, Nils "DSD: A Schema Language for XML", *ACM, FSMP* Portland Oregon (2000),101-111.

Watt, Andrew "Microsoft Office Infopath 2003 Kick Start", (*Published by Sams*) Print ISBN-10:0-672-32623-X, (Mar. 24, 2004),1-57.

Grosso, et al., "XML Fragment Interchange", W3C,(Feb. 2001),1-28.

"XForm 1.0,", W3C,(Jul. 16, 2001).

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 06, 2006, at <<http:www://is-edu.hcmuns.edu.vn/WebLib/books/Web/Tel/html13-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Laura Acklen & Read Gilgen, "Using Corel Wordperfect 9", 251-284, 424-434, 583-586 (1998).

"A tour of Xmetal" O'Reilly XML.COM 'Online Jul. 14, 1999 XP002230081 retrieved from the Internet: <URL:http:// www.xml.com/pub/a/SeyboldReport/ip0311025.html> retrieved on Feb. 5, 2003.

"Architecture for a Dynamic Information Area Control" IBM Technical Disclosure Bulletin IBM Corp. New York US vol. 37 No. 10 Jan. 10, 1994. pp. 245-246.

"Netscape Communicator's Collapsible Toolbars" CHI'98 Human Factors in Computing Systems Conference Proceedings Los Angeles CA Apr. 18-23, 1998 pp. 81-86.

Barker et al., "Creating In-Line Objects Within An Integrated Editing Environment," IBM Technical Disclosure Bulletin, vol. 27, No. 5, Oct. 1984, p. 2962.

"Flexible Information Presentation with XML" 1998 The Institution of Electrical Engineers 6 pages.

Berg A., "Naming and Binding: Monikers" Inside OLE, 1995, Chapter 9, pp. 431-490.

"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/0011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Sep. 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering Vo.1 11 No. 4 Jul./Aug. 1999. pp. 629-938.

Clapp D., "The NeXT Application Kit Part I: Non-Responsive Classes," The NeXT Bible 1990, Chapter 16, pp. 275-293.

Clark James—W3C Editor: "XSL Transformation (XSLT) Verison 1.0" Nov. 16, 1999 W3C (MIT INRIA Kejo) pp. 1-156.

W3C Editor James Clark and Ste; "XML Path Language (XPath) Version 1.0" Nov. 16, 1999 W3C (MIT INRIA Kejo) pp. 1-49.

"From Small Beginnings" Knowledge Management Nov. 2001 pp. 28-30.

"XML Editors: Allegations of Functionality in search of reality" Internet 'Online! 1999 XP002230082 retrieved from the Internet <URL:http://www.ivritype.com/xml/>.

"Photo Shop 5/5.5 WOW! Book" 2000 Peachpit Press pp. 8-17.

Description of Whitehill Composer software product producted by Whitehill Technologies Inc. available at <http://www.xml.com/pub/p/221> accessed on Apr. 8, 2004, two pages.

DiLascia et al., "Sweeper" Microsoft Interactive Developer, vol. 1, No. 1, 1996, 27 pages.

"XML Spy Tops as XML Editor" http://www.eweek.com/article2/0395972404100.asp Nov. 25, 2002 4 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online] Jun. 1999 URL: http://web.archive.org/web/19990912001527/http://www.tildeslash.com/tsbiff/.

Herzner et al.. "CDAM- Compound Document Access and Management. An Object-Oriented Approach" Multimedia Systems Interaction and Applications, 1992, Chapter 3, pp. 17-36.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Kobayashi et al.. "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—impact and opportunities" Survey and Statistical Computing 1996. Proceedings of the Second ASC International Conference. Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Pubishing 1999 Chapter 31 Section: Data Streaming 6 pages.

Peterson B., "Unix Variants," Unix Review, vol. 10, No. 4. Apr. 1992, pp. 29-31.

Pike et al., "Plan 9 from Bell Labs" UKUUG. Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "ProtectingData from Malicious Software"; 18th Annual Computer Security Applications Conference; 2002; pp. 199-208.

Staneck W., "Internal and External Media" Electronic Publishing Unleashed, 1995, Chapter 22. pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

LeBlond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

"Microsoft Word 2000 Screenshots", (2000),11-17.

XmlSpy,"XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Kay, Michael "XSL Transfornmations (XSLT) Version 2.0", http://www.w3.org/TR/2005/WD-xslt20-20050404, (04/205),1-374.

"Non Final OA", U.S. Appl. No. 10/939,588, filed Feb. 18, 2009,40 pages.

"Notice of Allowance", U.S. Appl. No. 10/404,312, filed Jan. 12, 2009,12 pages.

"Final Office Action", U.S. Appl. No. 10/857,689, filed Jan. 6, 2009,23 pages.

"Non Final Office Action", U.S. Appl. No. 10/977,198, filed Feb. 2, 2009,15 pages.

"Non Final Office Action", U.S. Appl. No. 10/939,588, filed Feb. 18, 2009,40 pages.

"Non Final Office Action", U.S. Appl. No. 10/976,451, filed Feb. 23, 2009,39 pages.

"Non final Office Action", U.S. Appl. No. 11/234,767, filed Feb. 26, 2009,37 pages.

"Notice of Allowance", U.S. Appl. No. 11/167,514, filed Mar. 11, 2009,6 pages.

"Non Final Office Action", U.S. Appl. No. 10/942,528, filed Mar. 6, 2009,31 pages.

"Non Final Offfice Action", U.S. Appl. No. 11/170,521, filed Jan. 21, 2009,86 pages.

"Foreign Office Action", Application Serial No. 2,412,611, (Feb. 9, 2009),6 pages.

"Foreign Office Action", Application Serial No. 200610003709.2, (Jan. 9. 2009),8 pages.

"EP Office Action", Application Serial No. 06111546.5, (Oct. 15, 2008),5 pages.

"Notice of Re-Examination", Application Serial No. 01813138.7, (Mar. 11, 2009),27 pages.

"Notice of Allowance", U.S. Appl. No. 10/988,718, filed Apr. 9, 2009.

"Final Office Action", U.S. Appl. No. 11/107,347, filed Apr. 2, 2009,15 pages.

"Restriction Requirement", U.S. Appl. No. 11/227,550, filed Apr. 2, 2009,8 pages.

"Non Final Office Action", U.S. Appl. No. 10/988,720, 19 pages.

"Final Office Action", U.S. Appl. No. 11/203,818, filed Apr. 14, 2009,31 pages.

"Final Office Action", U.S. Appl. No. 11/044,106, filed Apr. 13, 2009,20 pages.

"Final Office Action", U.S. Appl. No. 11/226,044, filed Apr. 20, 2009,24 pages.

"Final Office Action", U.S. Appl. No. 11/056,500, filed Apr. 16, 2009,10 pages.

"Non Final Office Action", U.S. Appl. No. 10/955,666, filed May 7, 2009,28 pages.

"Non Final Office Action", U.S. Appl. No. 10/876,433, filed Apr. 24, 2009,62 pages.

"Non Final Office Action", U.S. Appl. No. 10/916,692, filed Apr. 30, 2009,14 pages.

"HP Blade Sever BH Series Operating System Guide", Hewlett-Packard (Jul. 2002).

"Non Final Office Action", U.S. Appl. No. 09/599,809, filed May 13, 2009.

"Non Final Office Action", U.S. Appl. No. 11/295,178.

"Non Final Office Action", U.S. Appl. No. 10/990,152.

"Final Office Action", U.S. Appl. No. 11/036,910, filed Jun. 1, 2009,15 pages.

"Non Final Office Action", U.S. Appl. No. 10/857,689, filed Jun. 11, 2009,25 pages.

"Non Final Office Action", U.S. Appl. No. 11/095,254, filed Jun. 8, 2009,21 pages.

"Final Office Action", U.S. Appl. No. 11/234,767, 24 pages.

"Foreign Office Action", Application Serial No. 2002-503702, Final Notice of Rejection,(Jun. 5, 2009).

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999), 182 pages.

Acklen, et al., "Using Corel WordPerfect 9", Que Corporation,,(1998),pp. 251-284, 424-434, 583-585.

"Final Office Action", U.S. Appl. No. 10/976,451 (Jul. 2, 2009), 22 pages.

"Non-Final Office Action", U.S. Appl. No. 11/227 550 (Aug. 3, 2009),45 pages.

"Foreign Office Action", Application Serial No. 200610051554.X, (Jul. 10, 2009),11 pages.

"Non-Final Office Action", U.S. Appl. No. 11/234,767, 150 Pages.

"Non-Final Office Action", U.S. Appl. No. 11/234,767, (Aug. 12, 2009), 150 pages.

"Final Office Action", U.S. Appl. No. 10/977,198, (Aug. 19, 2009),36 pages.

* cited by examiner

ENABLING SELECTION OF AN INFERRED SCHEMA PART

BACKGROUND

Currently, electronic documents are often converted from one type of document to another using the pre-converted electronic document's visual information. An Optical Character Recognition (OCR) process, for instance, scans a printed document or rasterizes an electronic copy of a document to gain this visual information. The OCR process then analyzes this visual information to determine the document's text, layout, and data-entry fields, which it uses to build an electronic document of another type.

But OCR and other current conversion processes are limited. They often build converted documents having static, limited functions. They often cannot effectively analyze electronic documents written in an unfamiliar human language. They often do not correctly recognize a document's data-entry fields. And they often do not inform a user about—or enable a user to fix—problems with the converted document.

SUMMARY

Systems and/or methods ("tools") are described that convert or present conversion problems for electronic documents. The tools may convert a generally unstructured electronic document to a generally structured electronic document using non-visual textual and layout information of the unstructured document. The tools can also present possible problems with this or other types of conversion. And the tools can enable a user to alter an electronic document's schema without altering its visual layout.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes system(s) and/or method(s) ("tools") capable of converting generally unstructured electronic documents to generally structured electronic documents using non-visual information. The tools may also present problems with this or other conversions, such as in a user interface correlating the problems and visual constructs associated with those problems. The tools may also enable a user to alter a schema of an electronic document's visual construct without altering the visual construct's layout.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
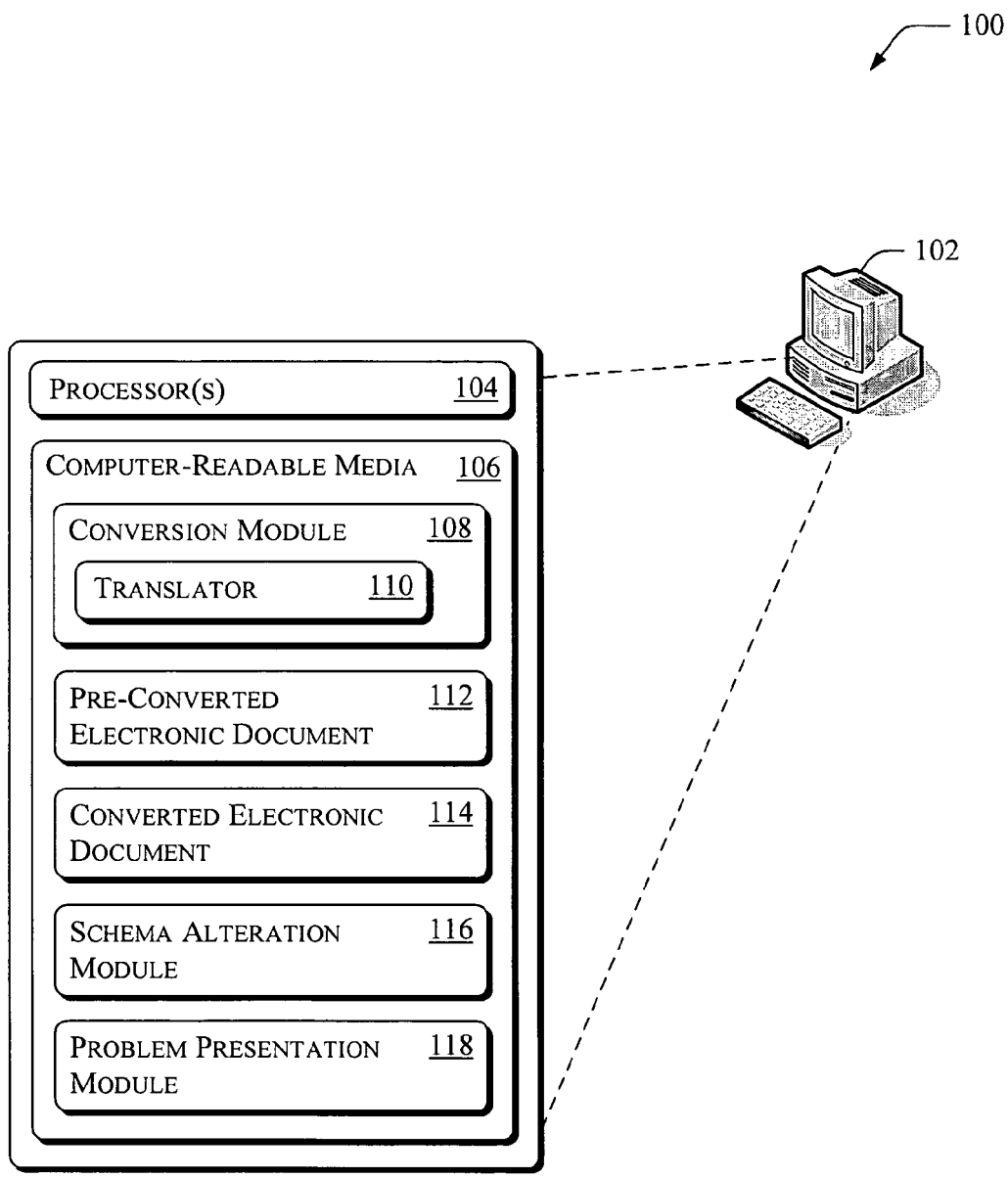
FIG. 1 illustrates an exemplary operating environment in which various embodiments can operate.

FIG. 1 illustrates one such operating environment generally at 100 comprising a computer 102 having one or more processors 104 and computer-readable media 106. The processors are capable of accessing and/or executing the computer-readable media. The computer-readable media comprises or has access to a conversion module 108 capable of converting an electronic document having data not linked to a structured schema to an electronic document having data linked to a structured schema. The conversion module can comprise or have access to a translator 110 capable of converting an electronic document file format that has non-visual textual and layout information (e.g., .doc (Microsoft®) Office™ Word™ Document), .xls (Microsoft® Office™ Excel™ Document), and .pdf (Adobe™ Portable Document Format)) into a markup language stream of textual and layout information (e.g., WordProcessingML (WordML) or HyperText Markup Language (HTML)).

The computer-readable media can also comprise or have access to an electronic document having data not linked to a structured schema. This electronic document is referred to as the pre-converted electronic document, marked in FIG. 1 at 112. The pre-converted electronic document is generally unstructured, such as by having at least some of its data not mapped to a structured schema, though it may have some data so mapped or structured. For example, a Microsoft® Office™ Excel™ document having an ActiveX control or a WordPerfect™ document having a macro-governed control where the macro is associated with a structured schema are electronic documents that are generally unstructured but have some data mapped to a structured schema.

A converted electronic document is shown in FIG. 1 at 114. This converted electronic document is generally structured, having data mapped to a structured schema. Exemplary conversion processes for converting electronic document 112 to electronic document 114 are described in greater detail below.

Operating environment 100 also comprises a schema alteration module 116 and a problem presentation module 118. Each of these modules can be part of or separate from the conversion module and can operate independently or jointly with modules shown in FIG. 1. The schema alteration module enables a user to add, alter, and/or select between schemas capable of governing a same visual construct that enable different functionality. The problem presentation module presents problems, potential problems, conversions made with a low degree of confidence, and/or known conversion errors to a user.

Figure 2:
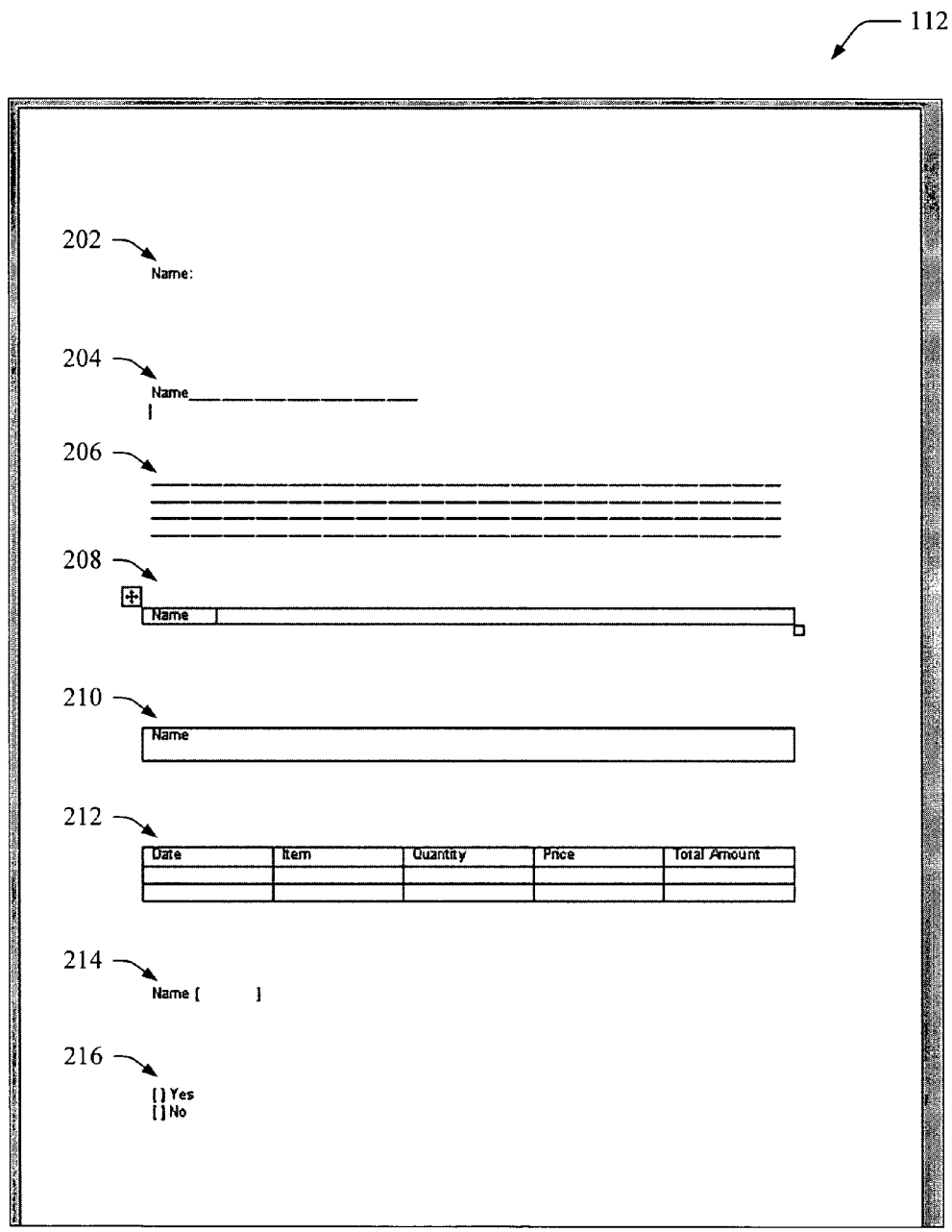
FIG. 2 illustrates a visual representation of an exemplary pre-converted document.

FIG. 2 illustrates a visual representation of an exemplary pre-converted document 112. The pre-converted document is a Word™ document with fields and regions in which a user may input data. This document is shown with text followed by a colon and a carriage return at 202, text followed by an underline at 204, a set of multiple underlines at 206, two cells of a table at 208, a single cell with text at 210, a table having multiple rows at 212, text with brackets and about ten spaces in the brackets at 214, and multiple brackets preceding text and having no more than one space between pairs of brackets at 216.

Conversion

The following discussion describes exemplary ways in which elements of operating environment 100 may convert electronic documents using non-visual information.

Figure 3:
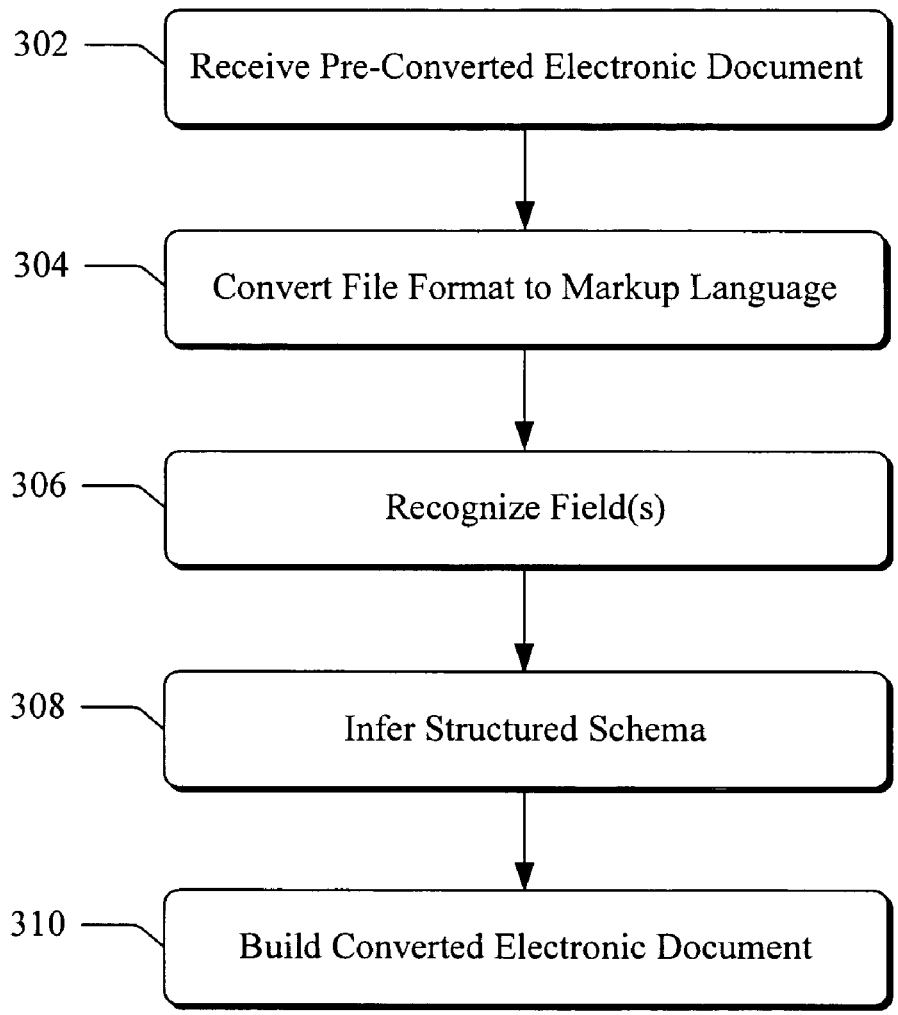
FIG. 3 is an exemplary process for converting electronic documents using non-visual information.

In FIG. 3, an exemplary process 300 is shown illustrated as a series of blocks representing individual operations or acts performed by elements of the operating environment 100 of FIG. 1, such as conversion module 108. This and other processes disclosed herein may be implemented in any suitable hardware, software, firmware, or combination thereof, in the case of software and firmware, these processes represent a set of operations implemented as computer-executable instructions stored in computer-readable media 106 and executable by processor(s) 104.

Block 302 receives non-visual textual and layout information for an electronic document having data not linked to a structured schema, such as pre-converted electronic document 112. The electronic document can be received as a stream of markup language formatting information or otherwise. If the electronic document is received in another file format, optionally block 304 can translate the pre-converted electronic document's file format to a common format. For example, block 304 can receive one of many different types of file formats (e.g., WordML) and convert this format to a common format (e.g., HTML). If the common format is the same as the format received, block 304 does not convert it.

The textual and layout information is non-visual at least because it is not dependent on a rendering or visual representation of the electronic document. Optical character recognition processes, on the other hand, rely on a visual representation (whether printed, rasterized, or the like) to convert documents.

In the illustrated embodiment, conversion module 108 receives the pre-converted electronic document rendered in FIG. 2 as a stream of WordML. The stream of WordML for the text, colon, and space at 202 in FIG. 2 is:

<w:p>
  <w:r>
    <w:t>
      Name:
    </w:t>
  </w:r>
</w:p>

Block 306 recognizes one or more fields of the electronic document based on its non-visual textual and layout information. Block 306 may apply various rules to recognize fields using this non-visual information, examples of which are described below.

In the illustrated embodiment conversion module 108 applies seven rules. These rules are herein applied in order, one to seven, though other rules and orders may also be used.

The first rule analyzes non-visual textual and layout information to determine whether or not the electronic document has a short string of text (e.g., one to five characters) followed by a colon and one or more spaces. Here the first rule determines that the above WordML for the text, colon, and space at 202 in FIG. 2 indicates that the electronic document has a short string of text followed by a colon and one or more whitespace characters (spaces, tabs, or line breaks). The layout information of "<w:p>" and "</w:p>" indicates that the text, colon, and space are set off from other text in the electronic document. Based on this information, block 306 recognizes this portion of the electronic document as a single data-entry field.

This and other rules described below can recognize fields independent of the human language in the pre-converted electronic document. Here the word, colon, and space: "Name:" is used to determine a single data-entry field but could instead be of an arbitrary language or meaning. Thus, if the electronic document, instead of "Name: ", has "ОΞPTΞ: " or "Жөғ:", block 306 can still recognize a single data-entry field.

Other information can be associated with this recognized field. Here the single data-entry field has accompanying information of "Name: " or "Name:". Block 306 can indicate that this single data-entry field should be preceded by this text. Note that this text is an exact copy of the text from the data stream of WordML provided above. If it were instead "ОΞPTΞ: " or "Жөғ: ", that text would instead be associated with the single data-entry field.

Block 308 infers a structured schema capable of governing a recognized field. It can do so based on the output of block 306, such as with an indication that a single data-entry field has been recognized, as well as with information associated with the recognized field.

Responsive to performing the first rule, conversion module 108 infers the following schema part:

<xsd:element name="Name" type="xsd:string"/>

The conversion module also creates related information for this and other rules, which provides information about the rendering (orientation, font type, color, and the like) of the schema part. The related information in eXtensible Stylesheet Language (XSL) for the above schema part is:

```
<font face="Arial">Name:</font>
<span style="font-family: Arial; width:130px"
class="xdTextBox"      hideFocus="1"      title=""
xd:binding="my:Name"              tabIndex="0"
xd:xctname="plaintext" xd:CtrlId="CTRL1">
<xsl:value-of select="my:Name"/>
</span>
```

Blocks 306 and 308 may be repeated for each rule. In so doing, a converted electronic document may be built piece-by-piece, with multiple fields or groups of fields mapped to multiple pieces of structured schema. The resulting converted electronic document 114 is rendered in FIG. 4. The converted electronic document is shown after all seven rules have been applied over the data stream of the pre-converted electronic document. The data-entry field generated above is shown at 402. This data-entry field is rendered by applying the above related information (in XSL) on the above XML-based structured schema. Note that data-entry field 402 appears very similar to that of the text 202 for the pre-converted electronic document 112 shown in FIG. 2. Here a Word™ document having a space for a user to write in his or her name has been converted to an electronic document enabling a user to input his or her name into a data-entry field mapped to a structured schema.

The second rule analyzes non-visual textual and layout information to determine whether or not the pre-converted electronic document has any combination of three or more of the follow characters:

( )/_

If the pre-converted document does, block 306 recognized these characters as a field. In one embodiment, if the total number of characters is three to 59, the conversion module recognizes a text field and if more than 60 characters, a long text ("rich text" or "memo") field.

Here the second rule recognizes two fields based on the data stream received for pre-converted electronic document 112. The following WordML data stream is received:

<w:p>
  <w:r>
    <w:t>
Name_____
    </w:t>
  </w:r>
</w:p>

The second rule determines that the above WordML for the text and underline shown at 204 in FIG. 2 indicates that the pre-converted electronic document has a combination of between three and 59 underline characters. Based on this information, block 306 recognizes this portion of the electronic document as a single text data-entry field. The conversion module uses this recognized field and information associated with it (e.g., "Name") to infer the following schema:

<xsd:element name="Name" type="xsd:string"/>

The conversion module also generates the following related information in XSL:

---

<font face="Arial">Name</font>
    <span style="font-family: Arial; ; width:14em" class="xdTextBox" hideFocus="1" title="" xd:binding="my:Name" tabIndex="0" xd:xctname="plaintext" xd:CtrlId="CTRL2">
    <xsl:value-of select="my:Name"/>
    </span>

---

The text data-entry field enabled by the above XML schema and XSL is rendered at 404. Note that text data-entry field 404 appears very similar to that of the text 204 for the pre-converted electronic document.

The second rule analyzes non-visual textual and layout information and finds another combination of characters "( ) / _ ", here the total number being greater than 60. In response the conversion module recognizes a rich text field.

The WordML from which the second rule recognized a rich text field is:

---

<w:p>
  <w:r>
    <w:t>
_____
_____
_____
_____
_____
_____
    </w:t>
  </w:r>
</w:p>

---

The second rule determines that the above WordML for the underline shown at 206 in FIG. 2 indicates that the pre-converted electronic document has a combination of at least 60 underline characters. The conversion module uses this recognized field and information associated with it to infer the following schema:

---

<xsd:element name="field1"><xsd:complexType mixed="true">
<xsd:sequence><xsd:any minOccurs="0" maxOccurs="unbounded"
namespace="http://www.w3.org/1999/xhtml"
processContents="lax"/>
</xsd:sequence>
</xsd:complexType>
</xsd:element>

---

The conversion module also generates the following related information in XSL:

---

<span style="font-family: Arial; ; height: 50px;;width:100%" class="xdRichTextBox" hideFocus="1" title="" xd:binding="my:field1" tabIndex="0" xd:xctname="richtext" xd:CtrlId="CTRL3">
<xsl:copy-of select="my:field1/node( )"/>
</span>

---

The rich text data-entry field enabled by the above XML schema and XSL is rendered at 406. This enables a user to enter notes, text, and the like, similar to (or better than) what the user could do by writing on the lines shown at 206 in FIG. 2. By enabling entry of rich text, the user can enter tables, formatted text, and the like, which may not be possible in the pre-converted electronic document.

The third rule analyzes non-visual textual and layout information to determine whether or not the pre-converted electronic document has a table cell that is empty, has four borders, and does not have a dark background. If the pre-converted document does, block 306 recognized this field as a text data-entry field unless it has space for more than one line within the empty field. If so, block 306 recognizes it as a rich text data-entry field. The third rule is also capable of detecting a name for the field based on whether there is text in an adjacent (and thus non-empty) cell.

Here the third rule recognizes a text data-entry field based on data stream received for pre-converted electronic document 112. This rule, like the others, can analyze all of the data stream received, though only the following results in recognition of this field:

<w:tr>
  <w:tc>
    <w:tcPr>
      <w:tcW w:w="1008" w:type="dxa"/>
    </w:tcPr>
    <w:p>
      <w:r>
        <w:t>
        Name
        </w:t>
      </w:r>
    </w:p>
  </w:tc>
<w:tc>
  <w:tcPr>

```
    <w:tcW w:w="7848" w:type="dxa"/>
   </w:tcPr>
   <w:p/>
  </w:tc>
 </w:tr>
```

Thus, the third rule determines that the above WordML for the text and cell shown at 208 in FIG. 2 indicates that the pre-converted electronic document has a text data-entry field. The conversion module uses this recognized field and information associated with it to infer the following schema at block 308:

```
<xsd:element name="Name" type="xsd:string"/>
```

The conversion module also generates the following related information in XSL:

```
<tr>
<td style="padding-top:0pt;padding-left:5.4pt;padding-bottom:0pt;padding-right:5.4pt;padding-top:0pt;padding-left:5.4pt;padding-bottom:0pt;padding-right:5.4pt;border-top:windowtext 0.5pt solid;border-left:windowtext 0.5pt solid;border-bottom:windowtext 0.5pt solid;border-right:windowtext 0.5pt solid;border-right:windowtext 0.5pt solid;">
<div>
<font face="Arial">Name</font>
</div>
</td>
<td style="padding-top:0pt;padding-left:5.4pt;padding-bottom:0pt;padding-right:5.4pt;padding-top:0pt;padding-left:5.4pt;padding-bottom:0pt;padding-right:5.4pt;border-top:windowtext 0.5pt solid;border-left:windowtext 0.5pt solid;border-bottom:windowtext 0.5pt solid;border-right:windowtext 0.5pt solid;border-left:windowtext 0.5pt solid;">
<div>
<span style="font-family: Arial;  ; width:100%" class="xdTextBox" hideFocus="1" title="" xd:binding="my:Name" tabIndex="0" xd:xctname="plaintext" xd:CtrlId="CTRL4">
<xsl:value-of select="my:Name"/>
</span>
</div>
</td>
</tr>
```

The text data-entry field enabled by the above XML schema and XSL is rendered at 408.

The fourth rule analyzes the information to determine whether or not the pre-converted electronic document has a table cell that has a short piece of text, four borders, and a relatively large number of spaces or two or more lines. If the pre-converted document does, block 306 recognized this field as a text data-entry field with internally-oriented text.

The following data stream in WordML is received:

```
<w:tr>
 <w:tc>
  <w:tcPr>
   <w:tcW w:w="8856" w:type="dxa"/>
  </w:tcPr>
  <w:p>
   <w:r>
    <w:t>
    Name
    </w:r>
   </w:r>
  </w:p>
  <w:p/>
```

```
  </w:tc>
 </w:tr>
```

Based on this non-visual textual and layout information, the fourth rule determines that the single cell with text (shown at 210 in FIG. 2) indicates that the pre-converted electronic document has a text data-entry field.

The conversion module uses this recognized field and information associated with it to infer the following schema at block 308:

```
<xsd:element name="Name" type="xsd:string"/>
```

The conversion module also generates the following related information in XSL:

```
<tr>
<td style="padding-top:0pt;padding-left:5.4pt;padding-bottom:0pt;padding-right:5.4pt;padding-top:0pt;padding-left:5.4pt;padding-bottom:0pt;padding-right:5.4pt;border-top:windowtext 0.5pt solid;border-left:windowtext 0.5pt solid;border-bottom:windowtext 0.5pt solid;border-right:windowtext 0.5pt solid;">
<div>
<font face="Arial">Name</font>
</div>
<div>
<font face="Arial"> </font>
<span style=";  width:100%" class="xdTextBox" hideFocus="1" title="" xd:binding="my:Name" tabIndex="0" xd:xctname="plaintext" xd:CtrlId="CTRL5">
<xsl:value-of select="my:Name"/>
</span>
</div>
</td>
</tr>
```

Figure 4:
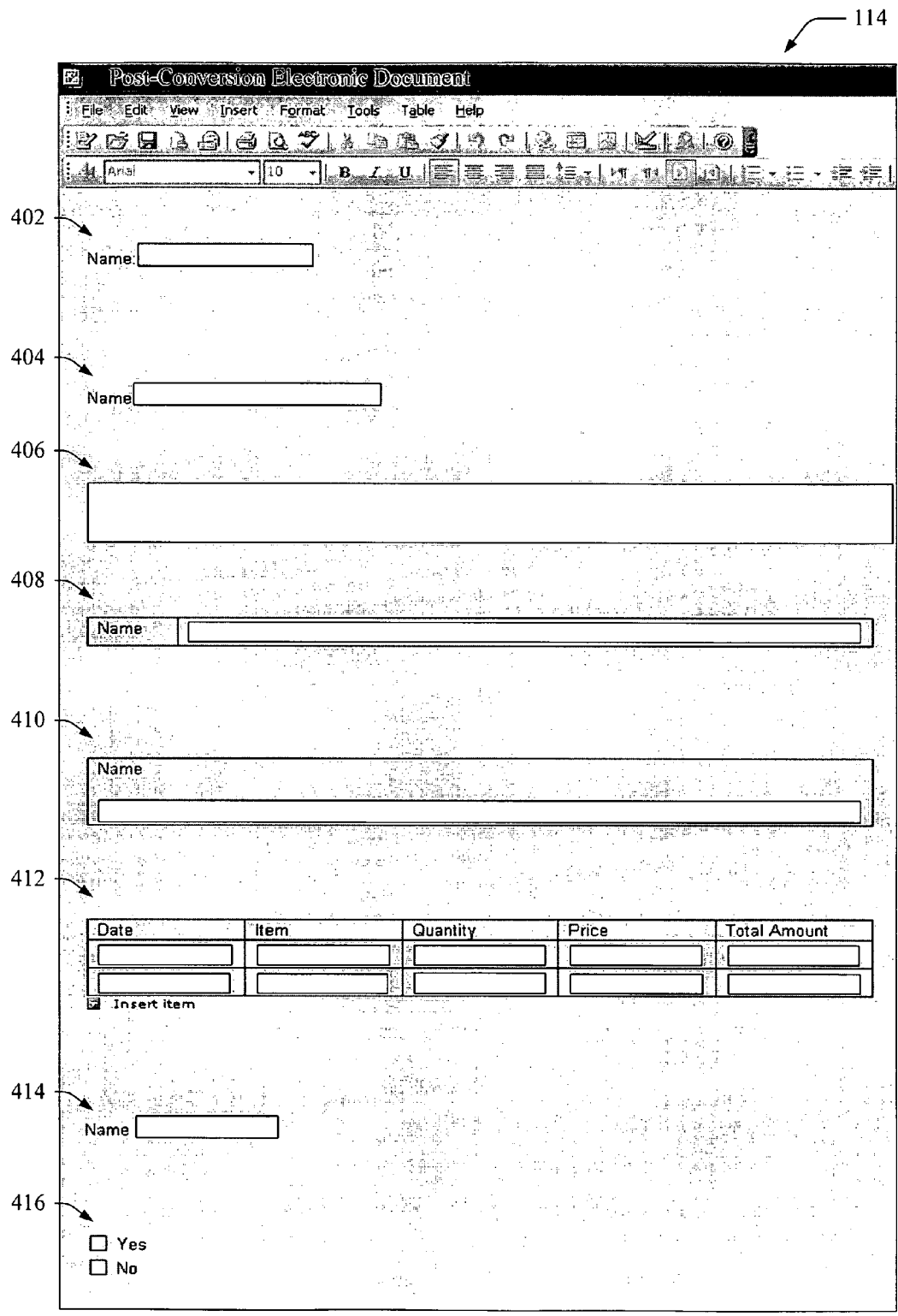
FIG. 4 illustrates a rendering of an exemplary converted electronic document.

The text data-entry field enabled by the above XML schema and XSL is rendered at 410 in FIG. 4.

The fifth rule analyzes the information to determine whether or not the pre-converted electronic document has two or more rows of fields having a similar or same size, orientation, and content. If the pre-converted document does, block 306 recognizes these fields as a repeating table. Repeating tables may not be enabled in the pre-converted electronic document. Nonetheless, the conversion module may recognize a repeating table, thereby enabling different (and likely superior) functionality to that enabled by the pre-converted electronic document. A repeating table allows a user to insert multiple rows or columns of data into the schema. A user may, for instance, fill in a row, select to dynamically add another row, and fill it in too, and so forth. The fifth rule is one example of block 308 inferring structured schema from non-visual textual and layout information of an electronic document.

The following data stream in WordML is received:

```
<w: tbl>
 <w:tr>
  <w:tc>
  <w:tcPr>
   <w:tcW w:w="1771" w:type="dxa"/>
  </w:tcPr>
  <w:p>
   <w:r>
    <w t>
    Date
    </w:t>
   </w:r>
  </w:p>
```

```
</w:tc>
<w:tc>
<w:tcPr>
<w:tcW w:w="1771" w:type="dxa"/>
</w:tcPr>
  <w:p>
    <w:r>
      <w:t>
      Item
      </w:t>
    </w:r>
  </w:p>
</w: tc>
<w:tc>
<w:tcPr>
<w:tcW w:w="1771" w:type="dxa"/>
</w:tcPr>
  <w:p>
    <w:r>
      <w:t>
      Quantity
      </w:t>
    </w:r>
  </w:p>
</w:tc>
<w:tc>
<w:tcPr>
<w:tcW w:w="1771" w:type="dxa"/>
</w:tcPr>
  <w:p>
    <w:r>
      <w:t>
      Price
      </w:t>
    </w:r>
  </w:p>
</w:tc>
<w: tc>
<w:tcPr>
<w:tcW w:w="1772" w:type="dxa"/>
</w:tcPr>
  <w:p>
    <w:r>
      <w:t>
      Total Amount
      21 /w:t>
    </w:r>
  </w:p>
</w:tc>
</w:tr>
<w:tr>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1772" w:type="dxa"/>
</w:tcPr>
  <w:p/>
</w:tc>
</w:tr>
<w:tr>
<w:tc>
<w:tcPr>
<w:tcW w:w="1771" w:type="dxa"/>
</w:tcPr>
  <w :p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1771" w:type="dxa"/>
</w:tcPr>
  <w:p/>
</w:tc>
<w:tc>
<w:tcPr>
<w:tcW w:w="1772" w:type="dxa"/>
</w:tcPr>
  <w:p/>
</w:tc>
</w:tr>
</w:tbl>
```

Based on this non-visual textual and layout information, the fifth rule determines that the table with multiple rows (shown at 212 in FIG. 2) indicates that the pre-converted electronic document has a table recognizable as a repeating table. The conversion module uses this recognized repeating table and information associated with it ("Date", "Item", and etc.) to infer the following schema at block 308:

```
<xsd:element name="group1">
<xsd:complexType>
<xsd:sequence>
<xsd:element   ref="my:group2"   minOccurs="0"
maxOccurs="unbounded"/>
</xsd:sequence>
</xsd:complexType>
</xsd:element>
<xsd:element name="group2">
<xsd:complexType>
```

-continued

```
<xsd:sequence>
<xsd:element ref="my:field3" minOccurs="0"/>
<xsd:element ref="my:field4" minOccurs="0"/>
<xsd:element ref="my:field5" minOccurs="0"/>
<xsd:element ref="my:field6" minOccurs="0"/>
<xsd:element ref="my:field7" minOccurs="0"/>
</xsd:sequence>
</xsd:complexType>
</xsd:element>
```

The conversion module also generates the following related information in XSL:

```
<table class="xdLayout xdRepeatingTable"
style="border-right: none; table-layout:
fixed; border-top: none; border-left: none;
border-bottom: none; border-collapse:
collapse; word-wrap: break-word; border-
top:windowtext    0.5pt    solid;border-
left:windowtext    0.5pt    solid;border-
bottom:windowtext    0.5pt    solid;border-
right:windowtext 0.5pt solid;width: 442.8pt;"
border="1" xd:CtrlId="CTRL6">
      <colgroup>
            <col
style="width:88.55pt"></col>
            <col
style="width:88.55pt"></col>
            <col
style="width:88.55pt"></col>
            <col
style="width:88.55pt"></col>
            <col
style="width:88.6pt"></col>
      </colgroup>
      <tbody
class="xdTableHeader">
            <tr>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-bottom:windowtext    0.5pt
solid;border-right:windowtext 0.5pt solid;">
                        <div>
                              <font face="Arial">Date</font>
                        </div>
                  </td>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-bottom:windowtext    0.5pt
solid;border-left:windowtext    0.5pt
solid;border-right:windowtext 0.5pt solid;">
                        <div>
                              <font face="Arial">Item</font>
                        </div>
                  </td>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-bottom:windowtext    0.5pt
solid;border-left:windowtext    0.5pt
solid;border-right:windowtext 0.5pt solid;">
                        <div>
                              <font face="Arial">Quantity</font>
                        </div>
                  </td>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-bottom:windowtext    0.5pt
solid;border-left:windowtext    0.5pt
solid;border-right:windowtext 0.5pt solid;">
                        <div>
                              <font face="Arial">Price</font>
                        </div>
                  </td>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-bottom:windowtext    0.5pt
solid;border-left:windowtext 0.5pt solid;">
                        <div>
                              <font face="Arial">Total Amount</font>
                        </div>
                  </td>
            </tr>
      </tbody>
      <tbody
xd:xctname="repeatingtable"><xsl:for-each
select="my:group1/my:group2">
            <tr>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-top:windowtext    0.5pt
solid;border-bottom:windowtext    0.5pt
solid;border-right:windowtext 0.5pt solid;">
                        <div>
                              <span style="font-family: Arial;  ;
width:100%" class="xdTextBox" hideFocus="1"
title="" xd:binding="my:field3" tabIndex="0"
xd:xctname="plaintext" xd:CtrlId="CTRL7">
                                    <xsl:value-of select="my:field3"/>
                              </span>
                        </div>
                  </td>
                  <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext    0.5pt
solid;border-left:windowtext    0.5pt
solid;border-bottom:windowtext    0.5pt
solid;border-right:windowtext    0.5pt
solid;border-top:windowtext    0.5pt
```

-continued

```
solid;border-bottom:windowtext            0.5pt
solid;border-left:windowtext              0.5pt
solid;border-right:windowtext 0.5pt solid;">
        <div>
           <span    style="font-family:   Arial;   ;
width:100%"    class="xdTextBox"    hideFocus="1"
title=""    xd:binding="my:field4"   tabIndex="0"
xd:xctname="plaintext" xd:CtrlId="CTRL8">
             <xsl:value-of select="my:field4"/>
           </span>
        </div>
      </td>
                                               <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext         0.5pt
solid;border-left:windowtext              0.5pt
solid;border-bottom:windowtext            0.5pt
solid;border-right:windowtext             0.5pt
solid;border-top:windowtext               0.5pt
solid;border-bottom:windowtext            0.5pt
solid;border-left:windowtext              0.5pt
solid;border-right:windowtext 0.5pt solid;">
        <div>
           <span    style="font-family:   Arial;   ;
width:100%"    class="xdTextBox"    hideFocus="1"
title=""    xd:binding="my:field5"   tabIndex="0"
xd:xctname="plaintext" xd:CtrlId="CTRL9">
             <xsl:value-of select="my:field5"/>
           </span>
        </div>
      </td>
                                               <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext         0.5pt
solid;border-left:windowtext              0.5pt
solid;border-bottom:windowtext            0.5pt
solid;border-right:windowtext             0.5pt
solid;border-top:windowtext               0.5pt
solid;border-bottom:windowtext            0.5pt
solid;border-left:windowtext              0.5pt
solid;border-right:windowtext 0.5pt solid;">
        <div>
           <span    style="font-family:   Arial;   ;
width:100%"    class="xdTextBox"    hideFocus="1"
title=""    xd:binding="my:field6"   tabIndex="0"
xd:xctname="plaintext" xd:CtrlId="CTRL10">
             <xsl:value-of select="my:field6"/>
           </span>
        </div>
      </td>
                                               <td
style="padding-top:0pt;padding-
left:5.4pt;padding-bottom:0pt;padding-
right:5.4pt;padding-top:0pt;padding-
left:5.4pt;padding-bottom:0pt;padding-
right:5.4pt;border-top:windowtext         0.5pt
solid;border-left:windowtext              0.5pt
solid;border-bottom:windowtext            0.5pt
solid;border-right:windowtext             0.5pt
solid;border-top:windowtext               0.5pt
solid;border-bottom:windowtext            0.5pt
solid;border-left:windowtext windowtext 0.5pt solid;">
        <div>
           <span    style="font-family:   Arial;   ;
width:100%"    class="xdTextBox"    hideFocus="1"
title=""    xd:binding="my:field7"   tabIndex="0"
xd:xctname="plaintext" xd:CtrlId="CTRL11">
             <xsl:value-of select="my:field7"/>
           </span>
        </div>
      </td>
```

-continued

```
                                              </tr>
                                        </xsl:for-
each></tbody>
                                           </table>
```

The repeating table enabled by the above XML schema and XSL is rendered at 412 in FIG. 4. Names or titles for rows and columns of a repeating table can also be generated. Column names are shown at 412.

The sixth rule analyzes the information to determine whether or not the pre-converted electronic document has open and close brackets with a space or line between them. If more than one space or a line, the rule recognizes it as a text box. If more than 60 spaces or two lines, it recognizes it as a rich text box. Thus, if the text with brackets shown at 214 had 60 spaces instead of about 10, the sixth rule can recognize it as a rich text box, after which the conversion module can enable a rich text data-entry field similar to that of 406 shown in FIG. 4. If no more than one space resides between the brackets, the sixth rule recognizes it as a check box.

The following WordML is received for the pre-converted electronic document 112:

```
<w:p>
<w:r>
   <w:t>
Name [ ]
   </w:t>
</w:r>
</w:p>
```

Based on this non-visual textual and layout information, the sixth rule determines that the text with brackets having about ten spaces (shown at 214 in FIG. 2) indicates that the pre-converted electronic document has a textbox field. The conversion module uses this recognized field and related information about it to infer the following schema at block 308:

<xsd:element name="Name" type="xsd:string"/>

The conversion module also generates the following related information in XSL:

```
       <font face="Arial">Name </font>
                              <span         style="font-
family: Arial;   ; width:8em" class="xdTextBox"
hideFocus="1"    title=""    xd:binding="my:Name"
tabIndex="0"            xd:xctname="plaintext"
xd:CtrlId="CTRL12">
                              <xsl:value-of
select="my:Name"/>
                              </span>
```

The textbox field enabled by the above XML schema and XSL is rendered at 414 in FIG. 4.

The sixth rule also finds a group of two checkboxes. The following WordML is received:

```
<w:p>
<w:r>
   <w:t>
[ ] Yes
   </w:t>
</w:r>
<w:p>
<w:p>
<w:r>
   <w:t>
```

```
[ ] No
</w:t>
</w:r>
</w:p>
```

Based on this information, the sixth rule determines that the text with brackets having one space (shown at 216 in FIG. 2) indicates that the pre-converted electronic document has two checkbox fields.

The conversion module uses these recognized fields and related information about them to infer the following schema at block 308:

```
<xsd:element   name="Yes"   nillable="true"
type="xsd:boolean"/>
<xsd:element   name="No"    nillable="true"
type="xsd:boolean"/>
```

The conversion module also generates the following related information in XSL:

```
<div>
<input    style="font-family:   Arial;    ;
width:auto"    class="xdBehavior_Boolean"
title=""  type="checkbox"  xd:binding="my:Yes"
tabIndex="0"           xd:xctname="checkbox"
xd:CtrlId="CTRL13"    xd:boundProp="xd:value"
xd:offValue="false" xd:onValue="true">
<xsl:attribute name="value">
<xsl:value-of select="my:Yes"/>
</xsl:attribute>
<xsl:if test="my:Yes="true"">
<xsl:attribute
name="CHECKED">CHECKED</xsl:attribute>
</xsl:if>
<font face="Arial"> Yes</font>
</div>
<div>
<input    style="font-family:   Arial;    ;
width:auto"       class="xdBehavior_Boolean"
title=""  type="checkbox"  xd:binding="my:No"
tabIndex="0"          xd:xctname="checkbox"
xd:CtrlId="CTRL14" xd:boundProp="xd:value"
xd:offValue="false" xd:onValue="true">
<xsl:attribute name="value">
<xsl:value-of select="my:No"/>
</xsl:attribute>
<xsl:if test="my:No="true"">
<xsl:attribute
name="CHECKED">CHECKED</xsl:attribute>
</xsl:if>
<font face="Arial"> No</font>
</div>
```

The checkbox fields enabled by the above XML schema and XSL are rendered at 416 in FIG. 4. Rules one through six can be applied to many different types of electronic documents, such as Microsoft® Office™ Word™, WordPerfect™, Microsoft® Office™ Excel™, and Adobe™ Acrobat™ documents. The tools also comprise rules directed to particular types of electronic documents. In some situations, a particular type of document has non-visual textual and layout information specific to its type. Word™ documents, for instance, have form fields. To recognize these form fields a seventh rule can be applied.

The exemplary seventh rule analyzes non-visual textual and layout information to determine whether or not the pre-converted electronic document has a form field. WordML, for instance, can indicate that a form field is present in the pre-converted electronic document. Based on this indication, block 306 recognizes a text data-entry field. Block 308, similarly to as set forth above, infers a schema and associated information for that field.

Form fields, like many fields in electronic documents, may be very difficult or impossible to recognize visually. A form field in Word™, for instance, may be represented visually by a blank region without borders or other visual indicators by which an optical recognizer may be unable to recognize the form field.

After one or more pieces of schema and related information are created at block 308, block 310 builds a converted electronic document. It may do so piece-by-piece (i.e., as each new piece of schema is inferred) or at once. For the exemplary pre-converted electronic document 112 described above, conversion module 108 builds a hierarchical, structured schema governing the converted electronic document.

Figure 5:
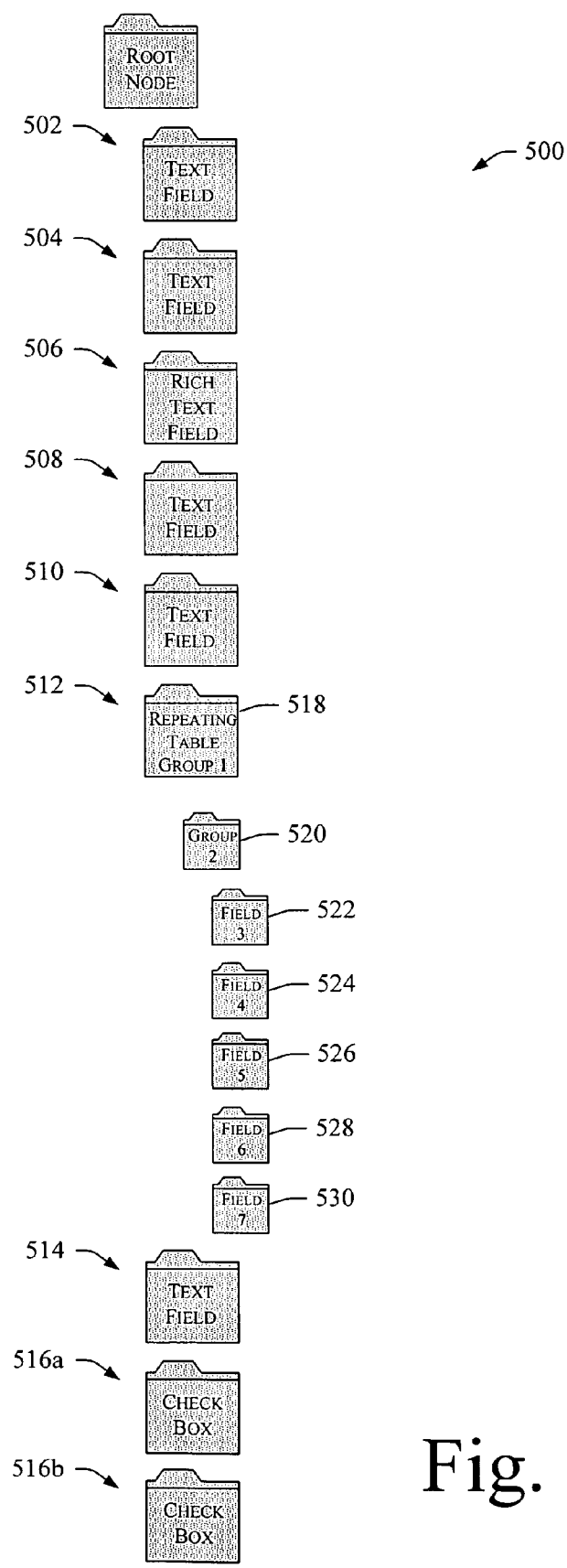
FIG. 5 illustrates a structured schema for the converted electronic document illustrated in FIG. 4.

FIG. 5 illustrates this hierarchical, structured schema for the exemplary converted electronic document at 500. The fields rendered in FIG. 4 at 402, 404, 406, 408, 410, 412, 414, and 416 map to schema illustrated at 502, 504, 506, 508, 510, 512, 514, and 516a and 516b, respectively. Note that the structured schema 512 for the repeating table shown at 412 permits an arbitrary number of rows for table 212 of the pre-converted electronic document. The structure of schema 512 is illustrated in part with six nodes subordinate to the repeating table (group 1) node 518. A container node is shown at 520, with five field nodes at 522, 524, 526, 528, and 530. The container node may be repeated an arbitrary number of times along with its subordinate field nodes for a particular instance of the converted electronic document.

Visual Constructs and Governing Schemas

The tools may alter or assign schemas for electronic documents having visual constructs capable of being governed by different schemas. The following discussion describes the tools in the context of operating environment 100, though other environments may be used.

Figure 6:
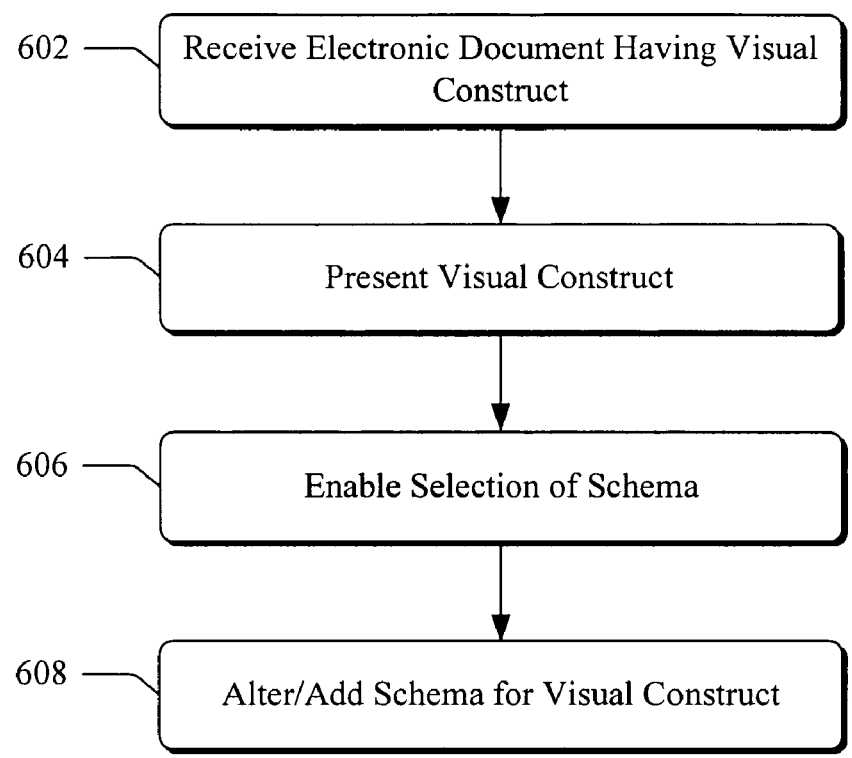
FIG. 6 is an exemplary process for altering or assigning schemas for electronic documents having visual constructs capable of being governed by different schemas.

FIG. 6 shows an exemplary process 600 illustrated as a series of blocks representing individual operations or acts performed by elements of the operating environment 100 of FIG. 1, such as schema alteration module 116. The tools may perform this process following block 306, 308, or 310 of FIG. 3. The tools may also perform this process with an electronic document received from an outside source, such as a third-party optical-recognition application. The electronic document received does not have to conform to a particular type or format other than having, or that may be altered to have, a visual construct capable of being governed by different schemas.

Block 602 receives an electronic document having a visual construct capable of being governed by different schemas. This visual construct can be a box, like a data-entry field, a table, like the tables shown in FIGS. 2 and 4, and the like. The electronic document does not have to include a schema governing its visual construct, or may instead be received with one or more schemas capable of governing its visual construct (e.g., by block 308 inferring schema for both a rich text data-entry field and a simple text data-entry field for a box-looking visual construct).

Block 604 presents the visual constructs of the electronic document.

Figure 7:
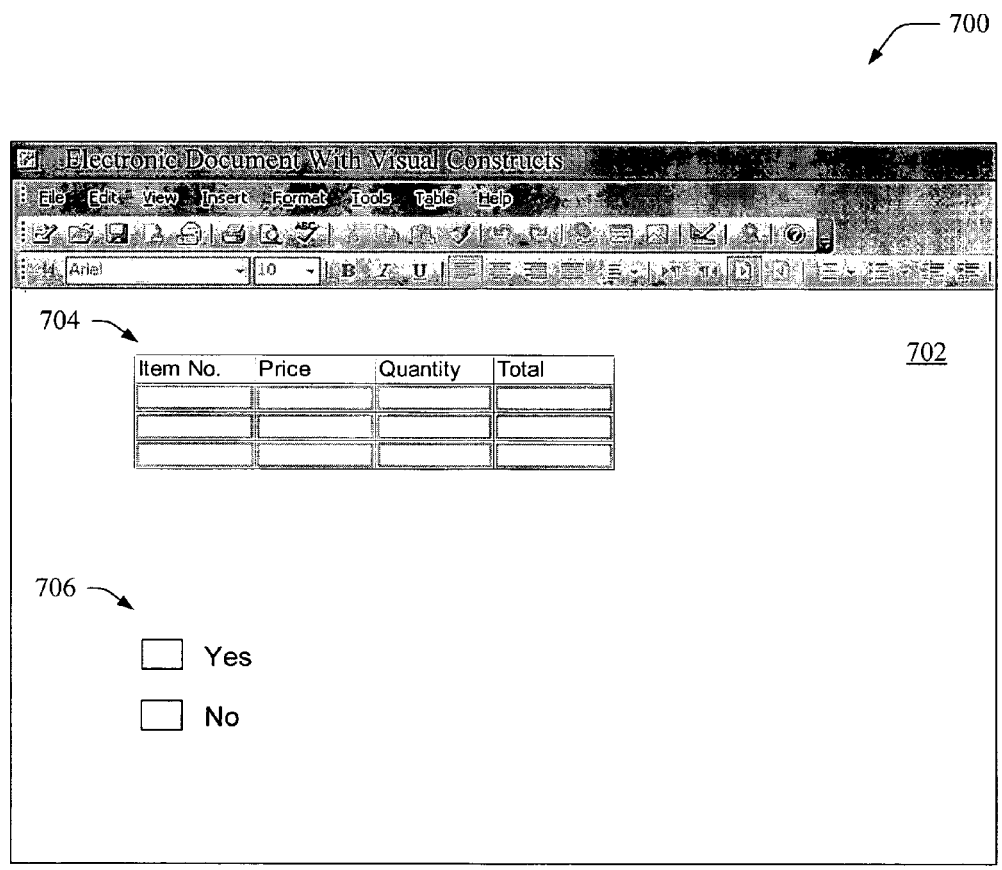
FIG. 7 illustrates an exemplary electronic document having two visual constructs.

In an illustrated embodiment, an electronic document is received having two visual constructs, each governed by a schema part. Here block 604 renders the visual constructs by transforming their schemas. FIG. 7 illustrates the rendering of an exemplary electronic document 702 having a first visual construct (a table 704) having four rows of four cells and a second visual construct (two small boxes 706).

The schema governing table 704 is non-structural, such that the table has a fixed number of cells. This schema is not capable of permitting a user to dynamically alter the number of cells in the table. This schema is:

```
<xsd:element name="myFields">
    <xsd:complexType>
        <xsd:sequence>
            <xsd:element ref="my:Total1" minOccurs="0"/>
            <xsd:element ref="my:ItemNo1" minOccurs="0"/>
            <xsd:element ref="my:Price1" minOccurs="0"/>
            <xsd:element ref="my:Quantity1" minOccurs="0"/>
            <xsd:element ref="my:ItemNo2" minOccurs="0"/>
            <xsd:element ref="my:Price2" minOccurs="0"/>
            <xsd:element ref="my:Quantity2" minOccurs="0"/>
            <xsd:element ref="my:Total2" minOccurs="0"/>
            <xsd:element ref="my:ItemNo3" minOccurs="0"/>
            <xsd:element ref="my:Price3" minOccurs="0"/>
            <xsd:element ref="my:Quantity3" minOccurs="0"/>
            <xsd:element ref="my:Total3" minOccurs="0"/>
        </xsd:sequence>
        <xsd:anyAttribute processContents="lax" namespace="http://www.w3.org/XML/1998/namespace"/>
    </xsd:complexType>
</xsd:element>
```

After conversion, the schema is:

```
<xsd:element name="group1">
    <xsd:complexType>
        <xsd:sequence>
            <xsd:element ref="my:group2" minOccurs="0" maxOccurs="unbounded"/>
        </xsd:sequence>
    </xsd:complexType>
</xsd:element>
<xsd:element name="group2">
    <xsd:complexType>
        <xsd:sequence>
            <xsd:element ref="my:ItemNo1" minOccurs="0"/>
            <xsd:element ref="my:Price1" minOccurs="0"/>
            <xsd:element ref="my:Quantity1" minOccurs="0"/>
            <xsd:element ref="my:Total1" minOccurs="0"/>
        </xsd:sequence>
    </xsd:complexType>
</xsd:element>
```

XSL for the repeating table is:

```
<table class="xdLayout xdRepeatingTable" style="BORDER-RIGHT: medium none; TABLE-LAYOUT: fixed; BORDER-TOP: medium none; BORDER-LEFT: medium none; WIDTH: 652px; BORDER-BOTTOM: medium none; BORDER-COLLAPSE: collapse; WORD-WRAP: break-word" border="1"
xd:CtrlId="CTRL13">
    <colgroup>
        <col style="WIDTH: 163px"></col>
        <col style="WIDTH: 163px"></col>
        <col style="WIDTH: 163px"></col>
        <col style="WIDTH: 163px"></col>
    </colgroup>
    <tbody class="xdTableHeader">
        <tr>
            <td>
                <div>
                    <font face="Verdana" size="2">Item No.</font>
                </div>
            </td>
            <td>
                <div>
                    <font face="Verdana" size="2">Price</font>
                </div>
            </td>
            <td>
                <div>
                    <font face="Verdana" size="2">Quantity</font>
                </div>
            </td>
            <td>
                <div>
                    <font face="Verdana" size="2">Total</font>
                </div>
            </td>
        </tr>
    </tbody><tbody vAlign="top" xd:xctname="repeatingtable">
        <xsl:for-each select="my:group1/my:group2">
            <tr>
                <td>
                    <div>
                        <font face="Verdana" size="2"><span class="xdTextBox" hideFocus="1" title="" tabIndex="0" xd:binding="my:ItemNo1" xd:CtrlId="CTRL2" xd:xctname="PlainText" style="WIDTH: 100%">
                            <xsl:value-of select="my:ItemNo1"/>
                        </span>
                    </font>
                    </div>
                </td>
                <td><span class="xdTextBox" hideFocus="1" title="" tabIndex="0" xd:binding="my:Price1" xd:CtrlId="CTRL3" xd:xctname="PlainText" style="WIDTH: 100%">
                    <xsl:value-of select="my:Price1"/>
                </span>
                </td>
                <td><span class="xdTextBox" hideFocus="1" title="" tabIndex="0" xd:binding="my:Quantity1" xd:CtrlId="CTRL4" xd:xctname="PlainText" style="WIDTH: 100%">
                    <xsl:value-of select="my:Quantity1"/>
                </span>
                </td>
                <td>
                    <div>
                        <font face="Verdana" size="2"><span class="xdTextBox" hideFocus="1" title="" tabIndex="0" xd:binding="my:Total1" xd:CtrlId="CTRL1" xd:xctname="PlainText" style="WIDTH: 100%">
                            <xsl:value-of select="my:Total1"/>
                        </span>
                    </font>
                    </div>
                </td>
            </tr>
        </xsl:for-each>
    </tbody>
</table>
```

The schema governing boxes 706 enables a user to check one, none, or both boxes. This schema can be received from block 308 of FIG. 3. By way of example, these boxes are governed by the same schema as that of the check boxes set forth in FIG. 4 at 416. Their schema is:

<xsd:element name="Yes" nillable="true" type="xsd:boolean"/>
<xsd:element name="No" nillable="true" type="xsd:boolean"/>

Block 606 enables a user to select a schema capable of governing a visual construct. The tools, here schema alteration module 116, enable a user to select either of the visual constructs with a single user action, such as clicking on the table 704 or boxes 706. The tools can present information indicating what functionality the user may select, and thus, the appropriate schema for the visual construct. For the table, the tools indicate that the table can have a fixed number of cells (4×4) or be a repeating table (4 columns and an arbitrary number of rows) (this is not shown). Here the table is fixed based on its current schema, such that selecting the table indicates a choice to make the table repeating.

Boxes 706 may also be selected. They are currently governed by a schema having a functionality permitting none, both, or one of them to be checked. A schema having a different functionality may instead be used, such as one enabling exactly one of the boxes to be selected (e.g., radio button functionality).

Responsive to a user's selection, block 608 alters the schema governing the visual construct. Here the schema alteration module replaces the current schema with another schema enabling different functionality but capable of governing the current visual construct. Thus, responsive to a user selecting table 704, block 608 replaces the current schema with a repeating table schema described as part of process 300 relating to table 412 and its schema 512 of FIGS. 4 and 5. The tools can also replace related information or other code, such as with the XSL also provided above.

Responsive to a user selecting the boxes, block 608 replaces its current schema enabling check boxes with schema enabling radio buttons. Thus, the above schema and associated information is replaced with schema (in XML) of:

```
<xsd:element name="field3" type="xsd:string"/>
Associated information is also replaced (in XSL) with:
<div><input class="xdBehavior_Boolean" title="" type="radio"
xd:binding="my:field3" xd:boundProp="xd:value"
xd:onValue="Yes" tabIndex="0" xd:xctname="optionbutton"
xd:CtrlId="CTRL1" name="{generate-id(my:field3)}">
                    <xsl:attribute
name="xd:value">
                            <xsl:value-of
select="my:field3"/>
                    </xsl:attribute>
                    <xsl:if
test="my:field3="Yes"">
                            <xsl:attribute
name="CHECKED">CHECKED</xsl:attribute>
                            </xsl:if>
                    </input> Yes</div>
        <div><input
class="xdBehavior_Boolean" title="" type="radio"
xd:binding="my:field3" xd:boundProp="xd:value"
xd:onValue="No" tabIndex="0" xd:xctname="optionbutton"
xd:CtrlId="CTRL2" name="{generate-id(my:field3)}">
                    <xsl:attribute
name="xd:value">
                            <xsl:value-of
select="my:field3"/>
                    </xsl:attribute>
```

-continued

```
                            <xsl:if
test="my:field3="No"">
                            <xsl:attribute
name="CHECKED">CHECKED</xsl:attribute>
                            </xsl:if>
                    </input> No</div>
```

Figure 8:
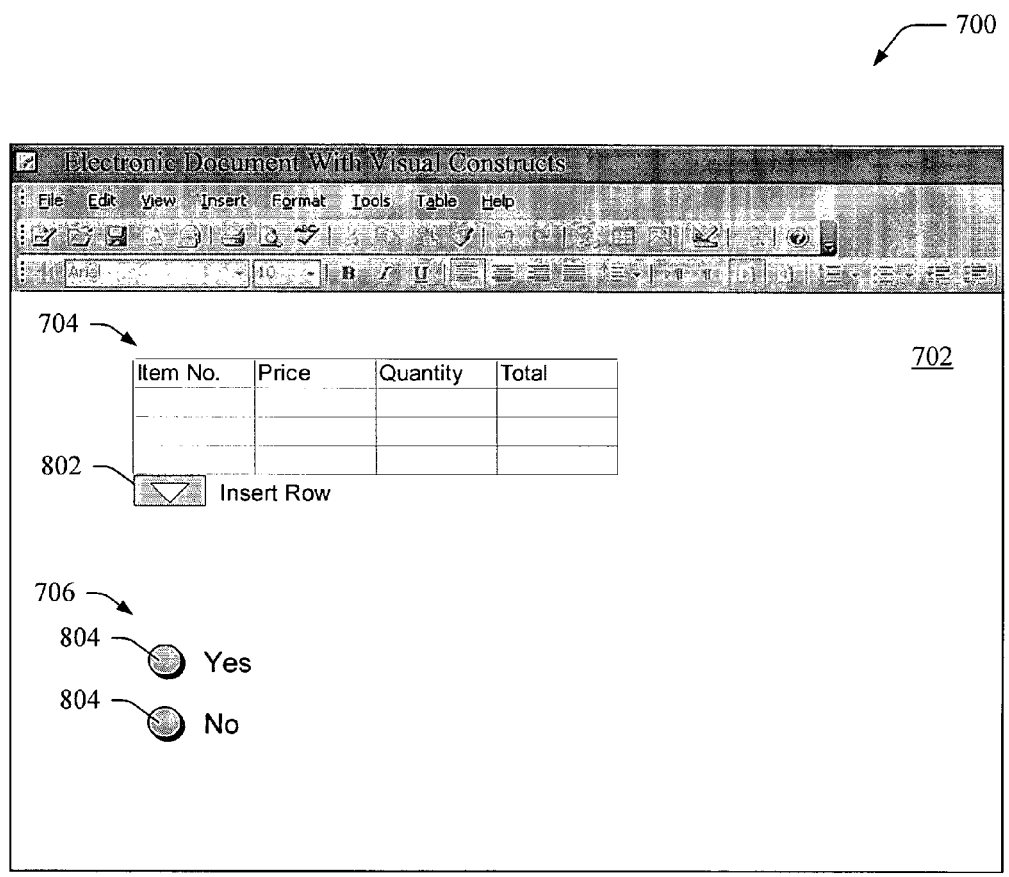
FIG. 8 illustrates the visual constructs of FIG. 7 with an altered appearance but the same layout.

In so doing, the tools enable a user to alter an electronic document's functionality while retaining the layout of its visual constructs. There may be (but do not have to be) differences in the visual construct's appearance. Slight changes in appearance are shown in FIG. 8. These slight changes do not change the layout of the visual construct. Both changes indicate to a user additional or different functionality. The repeating table functionality is indicated with a selectable graphic 802. The radio button functionality is indicated by the boxes being altered to look like buttons at 804. This change in appearance is optional; related information may be used that instead retains the exact same appearance for each visual construct.

The tools enable a user to change a schema governing a visual construct from non-structural to structural or vice-versa. The schema governing the table was at first non-structural in that it enabled a fixed number of cells. The new schema governing the table is structural, enabling the table to have repeating cells.

Presenting Conversion Problems

The tools can present conversion problems, such as potential differences, errors, or conversions with a low degree of confidence, to a user. In some cases part of a pre-converted electronic document is difficult for a converter to convert. An ActiveX control in an Excel™ document or a picture in a Word™ document, for instance, may not properly be converted.

In these cases, a converter, such as conversion module 108, can keep track of conversion problems. The following process receives conversion problems and presents them to a user. This process is described in the context of operating environment 100, though other environments may be used.

Figure 9:
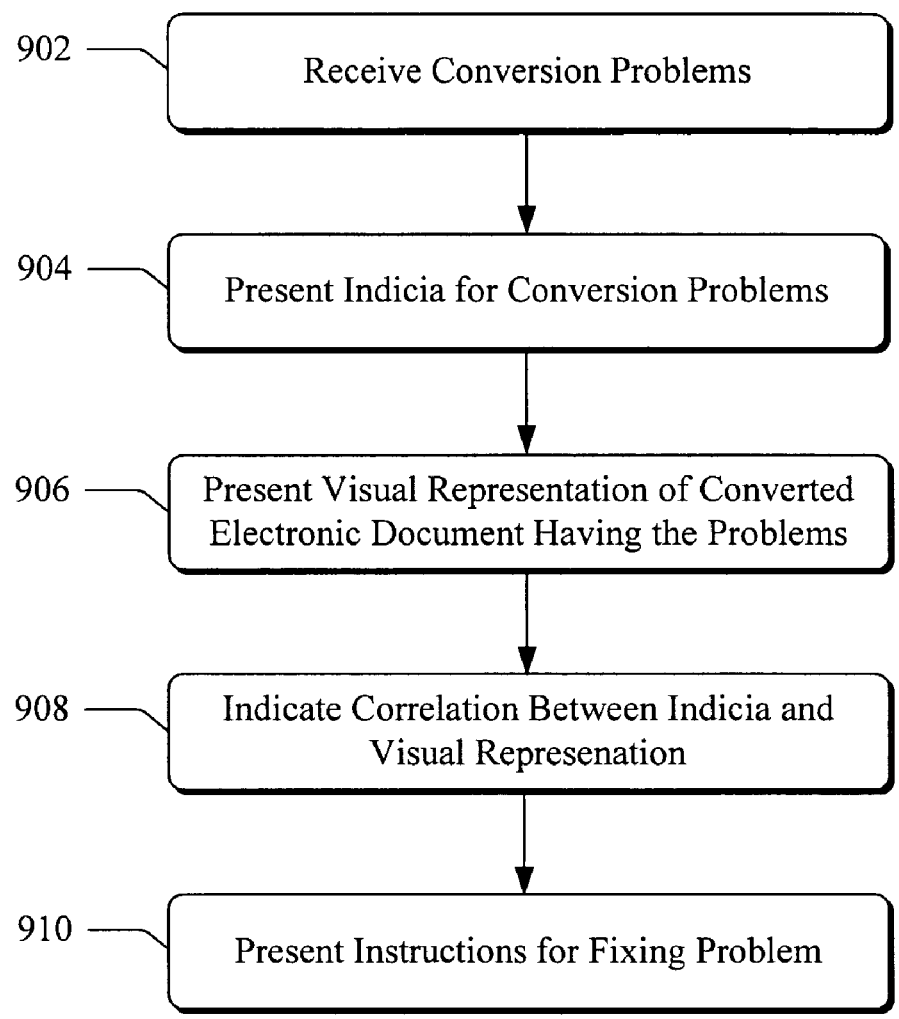
FIG. 9 is an exemplary process for presenting conversion problems.

FIG. 9 shows an exemplary process 900 illustrated as a series of blocks representing individual operations or acts performed by elements of the operating environment 100 of FIG. 1, such as problem presentation module 118. The tools may perform this process following block 306, 308, or 310 of FIG. 3. The tools may also perform this process based on conversion problems with a conversion performed by a third-party (e.g., an optical-recognition application).

Block 902 receives conversion problems. In one embodiment, conversion problems are recorded by conversion module 108 into a markup-language file, the conversion problems associated with converting an electronic document having data not linked to a structured schema (e.g., pre-conversion electronic document 112 of FIGS. 1 and 2). The converted electronic document (e.g., converted electronic document 114 of FIGS. 1 and 4) comprises data linked to a structured schema but also has a possible conversion problem.

Block 904 presents indicia of one or more conversion problems between a pre-converted electronic document and a converted version of the electronic document. These indicia may be presented associated with a visual construct of the converted electronic document, together in a region of a user interface, with text describing the conversion problem, and with instructions indicating ways in which the problem may be fixed. Block 906 presents a visual representation of at least a portion of the converted electronic document, such as visual constructs associated with the conversion problems.

Figure 10:
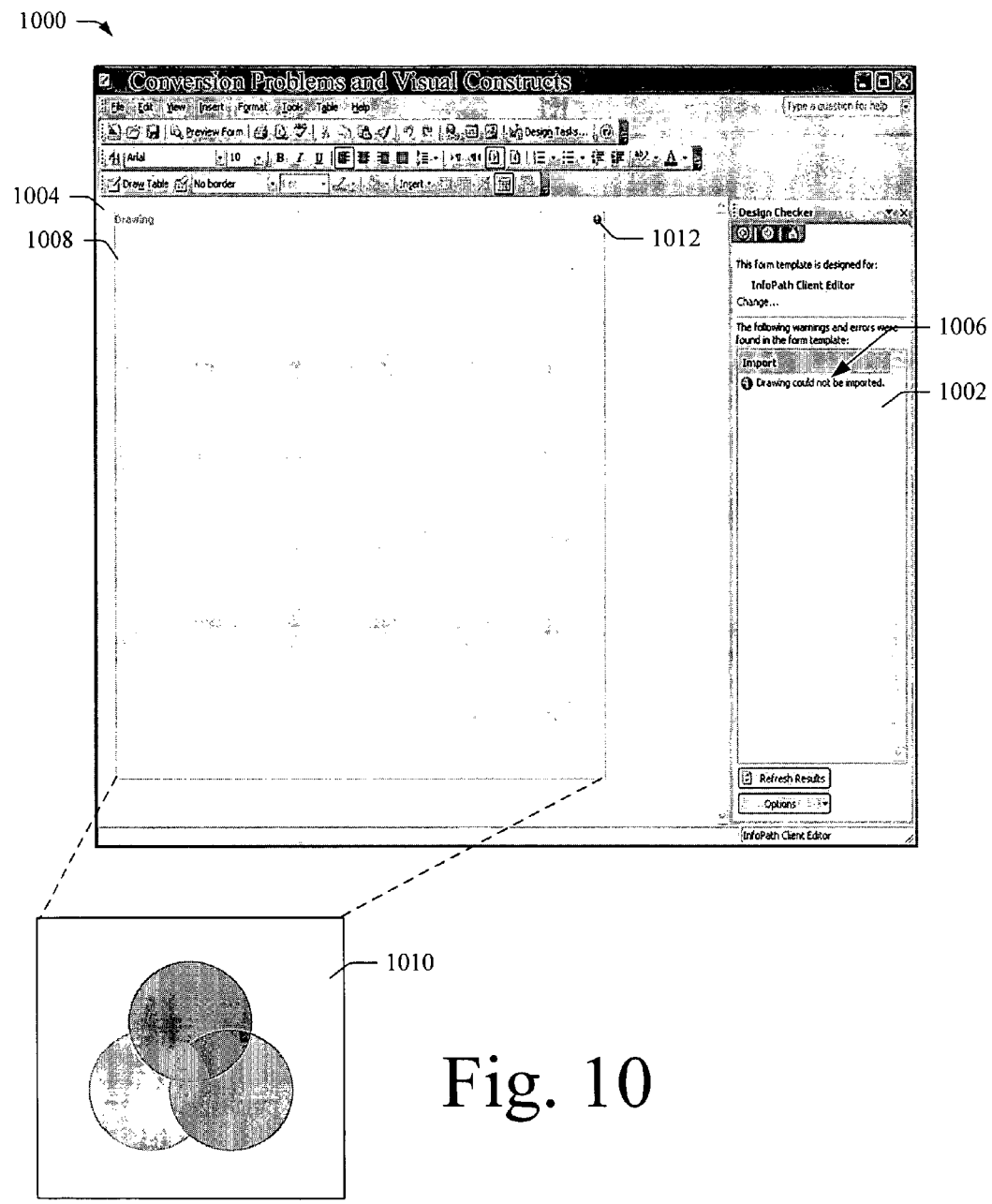
FIG. 10 illustrates an exemplary user interface having a conversion problem region and a rendering region.

In an illustrated embodiment, a conversion problem and a representation of a converted electronic document are presented in a user interface. FIG. 10 illustrates an exemplary user interface 1000 having two regions: a conversion problem region 1002 and a rendering region 1004. The conversion problem region presents conversion indicia 1006. The rendering region renders a visual construct 1008 associated with the conversion problem. The conversion problem is caused by a drawing in the pre-converted document. The drawing that caused the illustrated conversion problem is shown at 1010.

Block 908 visually indicates a correlation between the indicia and a visual construct associated with the conversion problem for those indicia. FIG. 10 also illustrates this correlation. Here a user selects (here by mousing over) indicia 1006. In response, block 908 highlights the visual construct for that indicia's conversion problem (highlight shown with graphic 1012). Indicia may inform the user about the conversion problem. Indicium 1006 includes text indicating that the drawing could not be imported.

Block 910 presents instructions indicating one or more actions selectable by a user and capable of eliminating a conversion problem.

CONCLUSION

The above-described systems and methods convert electronic documents, present problems in converting electronic documents, and enable alteration to schemas of electronic documents. These systems and methods may enable significantly improved conversion of electronic documents using non-visual information about the electronic documents. In so doing, these systems and methods may convert documents with fewer errors and generate converted electronic documents having greater functionality. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A method comprising:
   receiving non-visual textual and layout information for an electronic document having data not linked to a structured schema;
   recognizing, based on the information, a visual construct of the electronic document;
   inferring that the visual construct is capable of being governed by a first schema part or a second schema part, the first schema part and the second schema part enabling different functionality for the visual construct;
   building the electronic document;
   presenting the visual construct of the electronic document;
   enabling selection of the first schema part or the second schema part to provide a selected schema part; and
   adding the selected schema part to the electronic document, the selected schema part governing the visual construct.

2. The method of claim 1, wherein the act of adding the selected schema part is effective to replace a non-structural schema part with a structural schema part.

3. The method of claim 1, wherein the act of presenting renders the first schema part, the act of enabling enables selection of the second schema part, and the act of adding replaces the first schema part with the second schema part effective to alter the electronic document's schema but not a layout of the visual construct.

4. The method of claim 1, wherein one of the first and second schemas enables a fixed-cell table and the other enables a repeating table.

5. The method of claim 1, wherein one of the first and second schemas enables check-box fields and the other enables radio-button fields.

6. One or more computer-readable media having computer-readable instructions therein that, when executed by a computer, cause the computer to perform acts comprising
   receiving non-visual textual and layout information for an electronic document having data not linked to a structured schema;
   recognizing, based on the information, a visual construct of the electronic document;
   inferring that the visual construct is capable of being governed by a first schema part or a second schema part, the first schema part and the second schema part enabling different functionality for the visual construct;
   building the electronic document;
   presenting the visual construct of the electronic document;
   enabling selection of the first schema part or the second schema part to provide a selected schema part; and
   adding the selected schema part to the electronic document, the selected schema part governing the visual construct.

7. The media of claim 6, wherein the act of adding the selected schema part is effective to replace a non-structural schema part with a structural schema part.

8. The media of claim 6, wherein the act of presenting renders the first schema part, the act of enabling enables selection of the second schema part, and the act of adding replaces the first schema part with the second schema part effective to alter the electronic document's schema but not a layout of the visual construct.

9. The media of claim 6, wherein one of the first and second schemas enables a fixed-cell table and the other enables a repeating table.

10. The media of claim 6, wherein one of the first and second schemas enables check-box fields and the other enables radio-button fields.

* * * * *

UNITED STATES PATENT AND TRADEMARK OFFICE
CERTIFICATE OF CORRECTION

PATENT NO.         : 7,613,996 B2                                    Page 1 of 1
APPLICATION NO. : 11/203937
DATED              : November 3, 2009
INVENTOR(S)        : Nicholas K. Dallett et al.

It is certified that error appears in the above-identified patent and that said Letters Patent is hereby corrected as shown below:

In Title page, in field (75), under "Inventors" column 1, line 8, delete "Aleksandr Tysbert,"
and insert -- Aleksandr Tsybert, --, therefor.

Signed and Sealed this

Fourteenth Day of December, 2010

David J. Kappos
*Director of the United States Patent and Trademark Office*